Feb. 16, 1954  F. G. OUTCALT ET AL  2,669,640
SUBMERGED-MELT ELECTRIC SERIES-ARC WELDING
Filed May 22, 1950
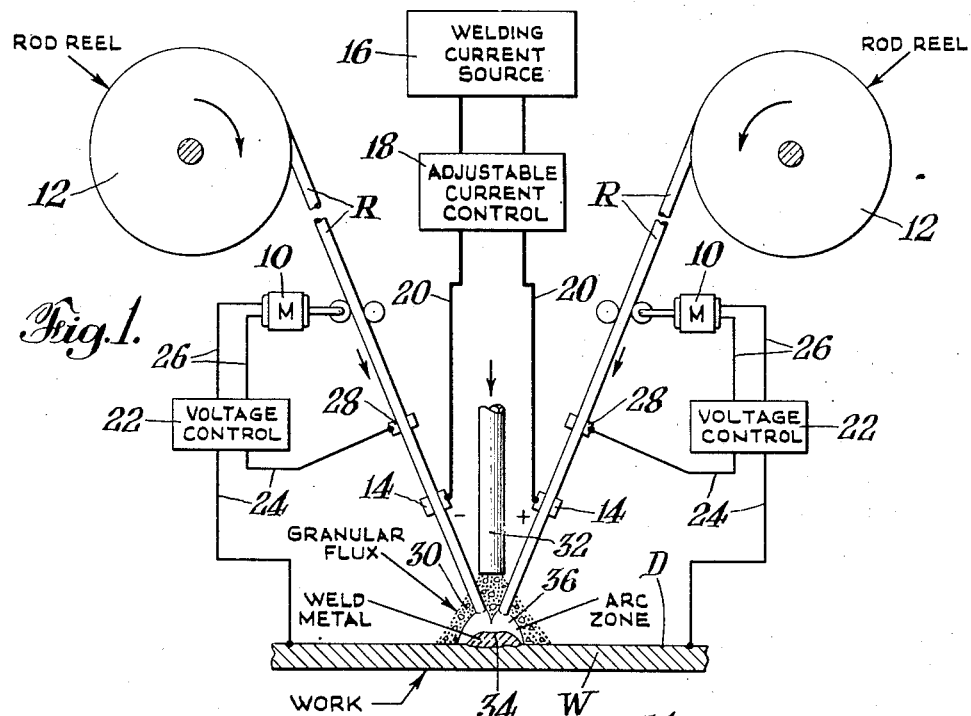
Fig. 1.
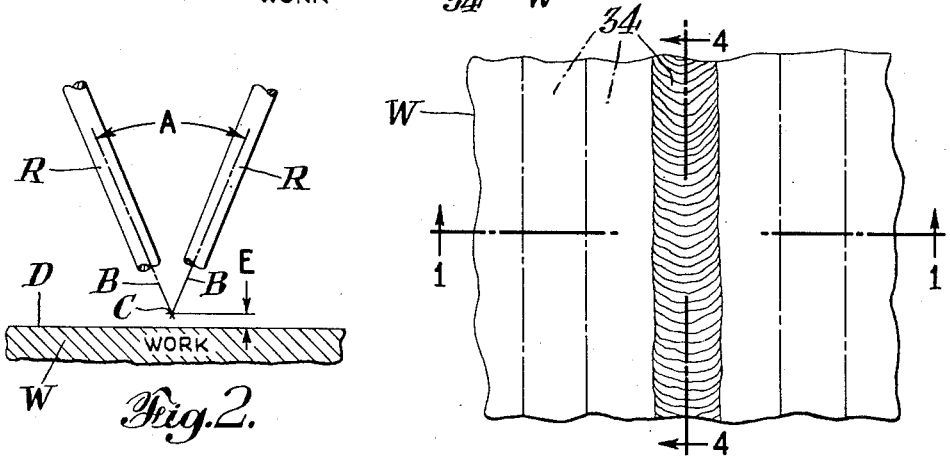
Fig. 2.
Fig. 3.
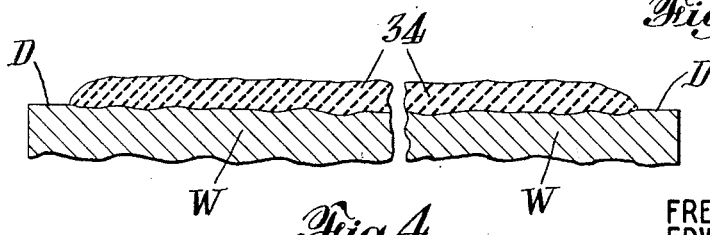
Fig. 4.
INVENTORS
FREDRICK G. OUTCALT
EDWARD L. FROST
BY D. C. Harrison
ATTORNEY Patented Feb. 16, 1954

2,669,640

UNITED STATES PATENT OFFICE 2,669,640

SUBMERGED-MELT ELECTRIC SERIES-ARC WELDING

Frederick G. Outcalt, New Rochelle, and Edward L. Frost, Snyder, N. Y., assignors, by mesne assignments, to Union Carbide and Carbon Corporation, a corporation of New York Application May 22, 1950, Serial No. 163,508

6 Claims. (Cl. 219—10)

This invention relates to submerged-melt electric-arc welding, and more particularly to the cladding or surfacing of a body of metal, and to the welding at joints in which minimum admixture of added welding material and base metal is desired and less than usual penetration is wanted.

There is disclosed in Jones, Kennedy, and Rotermund Patent 2,043,960 a submerged-melt electric welding process characterized by the fact that molten metal is deposited on and coalesced with molten metal of a workpiece from a bare metal electrode through a molten pool of a mineral-like welding flux while a deep blanket of unfused granular flux is maintained over the molten metal, pool, and end of the electrode; both the electrode and the workpiece being in the welding current circuit per se. Such process has been widely used and is notable for the high quality and deep penetration of the weld produced, and for the relatively high speed with which the weld is made.

Some of the primary advantages of such process, however, become disadvantages when, for example, such prior method of welding is employed for cladding and surfacing of one type of metal with another type of metal, or for welding a joint with a weld metal that is adversely affected by admixture of fused base metal. Because of the characteristically deep penetration normally obtained, dilution of the deposited metal is high. For surfacing or cladding such condition greatly increases the cost of producing a clad surface of a given composition by requiring either multiple layers or a greatly reduced rate of deposition. For both cladding and joint welding, dilution affects the properties of the weld metal. Even modifications of the prior automatic work-in-circuit welding techniques have not reduced the dilution values below a minimum of about 20%, and for many applications such dilution restricts the use of such prior process.

As a consequence, the weld metal contains a high percentage of fused base metal which may constitute up to 70% of the weld metal, the remaining amount consisting of deposited welding rod metal. Such a condition, though often highly advantageous for normal welding, is disadvantageous when, for example, using such process to clad or surface a plain-carbon or low-alloy steel workpiece with a metal of high-alloy content, such as any of the stainless steels or non-ferrous metals. It is then highly desirable to reduce dilution to a minimum. Similarly, minimum dilution is desirable when welding, for example, a joint in steel plate with a copper alloy weld metal. With the workpiece in circuit, the most effective cladding technique was to deposit the metal at a low speed of travel (4 to 6 inches/minute), with a low welding current (175 to 300 amperes) and a relatively high arc voltage (37 to 40 volts). Although the resultant deposits were quite uniform in cross-section, the welding voltage was extremely unstable under such conditions, and interruptions were encountered during welding. Typical dilutions for such welds vary from a minimum of approximately 15% to a maximum of 40% under substantially identical welding conditions. Because of this, it was necessary to compensate for dilution by employing a welding rod substantially higher in alloy content than that desired in the weld deposit, or by producing a multiple-layer buildup pad to increase the alloy content in each succeeding layer. Such operations obviously increased the cost of the product.

Such conditions have heretofore seriously retarded extensive use of such prior submerged-melt process for cladding, and for the joint welding of certain materials, especially with high-alloy metals.

The main object of this invention, therefore, is to provide a submerged-melt electric-arc welding process or system which overcomes such conditions; and drastically reduces weld penetration, as well as dilution of the weld deposit, without any sacrifice in the speed of deposition. Another object is to increase the rate of deposition when minimum dilution is not the primary requirement.

This new process of submerged-melt electric arc welding comprises connecting at least two welding electrodes in series electrically with each other and with an appropriate power source, using suitable rod feed mechanisms to control the rate of rod-feed, setting the spacing and the angle between the rods to minimize penetration into the workpiece and to confine the weld to a common pool, and relatively moving either the workpiece, or the welding electrodes, with respect to each other in such a manner as to deposit and weld under a blanket of suitable flux a single continuous layer or pad of rod metal on the workpiece. In carrying out the invention an essential feature is that the arc welding current flows directly from the end of one rod to the other principally through the molten welding flux and weld metal—not through the workpiece.

With the new process it is possible to greatly reduce the penetration of the weld into the workpiece, to increase the weld width, and to produce deposits containing only a relatively small amount of parent metal that dilutes the deposited rod metal. For example, dilution as low as 1.5 percent has been obtained. Variation in weld width, reinforcement, penetration, and dilution can be controlled by regulation of rod positioning, welding current, welding voltage, travel speed, rod diameter, oscillation of the welding heads, or any combination thereof. Additional accomplishments of the process are at least a two-fold increase in the rate of welding rod deposition; and, compared with prior submerged melt welding, a lower rate of consuming or fusing the granular flux; and the possibility of controlling the composition of the deposit by using welding rods of different compositions to obtain an alloy different than both rods without objectional dilution by base metal. This method, therefore, has significant advantages in the field of cladding and surfacing with high alloy and hardenable welding rod compositions; and for applications requiring a relatively large amount of deposited metal.

In the drawing:

Fig. 1 is a view mainly in front elevation of submerged-melt welding apparatus illustrating the invention, the workpiece being shown in section on line 1—1 of Fig. 3;

Fig. 2 is an enlarged fragmentary view showing the relationship of the welding rods with each other and the workpiece;

Fig. 3 is a fragmentary top plan view of the resulting product; and

Fig. 4 is a fragmentary longitudinal view of such product taken on line 4—4 of Fig. 3.

For simplicity in describing the series arc principle the detailed description and discussion will be limited to the simple combination of two meltable metal rods or electrodes both of which, when melted, fuse into the weld deposit to form a single alloy. Other combinations of three or more electrodes may be used.

As shown in Figs. 1 and 2, two metallic electrodes or welding rods R, R, are fed by rod-feed motors 10, 10, from rod-supply reels 12, 12, through contact nozzles 14, 14 at an acute angle A toward each other, and toward workpiece W consisting of a base plate composed of another metal. The contact nozzles 14, 14, are connected to a suitable A. C. or D. C. welding current source 16 through an adjustable current control 18 by a suitable circuit including welding current leads 20, 20, so that the electrodes are in series with each other in such circuit. The workpiece W is not included in the welding current circuit per se. This is accomplished by arranging the electrodes so that their extended longitudinal axes B, B, intersect in the illustrated example at a point C near but above the surface D of the workpiece W by a distance or space E, which is maintained substantially constant during the welding operation, so that the welding current is carried between the electrodes principally through the molten flux or deposited metal, rather than any great amount of the total current being carried through the workpiece W in its passage between the electrodes. The rods R, R, are automatically fed by the respective motors 10, 10, at such a rate that the voltage between each rod and the work is maintained substantially constant, by, for example, voltage controls 22, 22 having input circuits 24, 24, and output circuits 26, 26. Each input circuit 24 is connected across the workpiece W and a brush 28 in contact with each electrode R. Each output circuit 26 is, likewise, connected to a motor 10.

Suitable granular flux 30 is supplied to cover the zone of the welding operation, as the latter progresses along the workpiece, by way of a tube 32 the outlet of which is located so as to supply the granular flux ahead of the welding arc which is formed between the ends of the rods R, R. As the rods are progressively melted, they are moved along a desired path over the surface D of the workpiece W, or the workpiece is moved under the rods, laying on and welding to the workpiece a bead or layer 34 of weld metal. In the following description this process is arbitrarily referred to as series-arc welding.

An electrical series-arc welding circuit is completed between the two electrodes, the ends of which are completely submerged in flux. It may be that a common arc zone 36 exists between such ends of the two welding rods, and the welding current path extends from one to the other through the molten flux and metal in the weld crater.

The resulting wide and flat deposits 34 which do not deeply penetrate the base metal W can be explained by fundamental knowledge of electrical behavior. It is known that if current flows in the same direction through two parallel conductors in close vicinity to each other, the magnetic flux field surrounding them will cause the conductors to attract each other. If the current direction is reversed in one conductor only, the magnetic forces tend to repel or separate the conductors.

Hence, in series-arc welding according to the invention, with either alternating current or direct current, the instantaneous polarity and current direction through the rods are opposite, as indicated by the (+) and (—) signs, Fig. 1. This condition creates a repulsion between the rods and tends to deflect the arc streams outwardly, the net result being a fanning-out or spreading of the arc zone 36. Because the rods are positioned in a plane transverse to the travel direction, this spreading effect results in a wide, thin weld-deposit 34.

The first tests made with the welding rods located in a plane transverse to the direction of welding immediately indicated the possibility of positive control over weld shape. Smooth weld surfaces and uniform edges were produced which blended satisfactorily into the base metal and showed exceptionally shallow and uniform penetration patterns. It has been demonstrated that the height of the deposit can be readily limited, and unusually smooth overlapping of successive beads was obtained. For many applications, a greater height of deposit is required, and this result can be readily accomplished with the technique of this invention. However, for cladding with expensive high-alloy materials, it is usually desirable to produce thin deposits.

Several important and unique properties of this method of welding are set forth below. Of particular consequence is the fact that the rate of deposition of the welding rods has been more than doubled as compared with results obtained with prior single-electrode work-in-circuit techniques. Deposition rates with the two welding rod series-arc technique of the invention varied from 0.82 to 1.43 pounds per 1000 amperes per minute, depending upon the current-density used. With the conditions which were most completely investigated, this rate was slightly in excess of 1.0 pound. The corresponding value for prior single-electrode work-in-circuit techniques is approximately 0.4 to 0.5 pound. Also, the amount of fused flux consumed during welding has been reduced somewhat, showing an average value of approximately 0.90 pound per pound of rod deposited. Another important effect observed in deposits with several of the stainless steel rods was that the fused flux could be removed easily and often was self-detaching. Even when a few fine slivers of fused flux were present on the surface of the welds, the remainder of the fused flux broke away clean without the necessity of chipping. The only preparation required before the deposition of the adjacent pass was a light cleaning, done manually with a wire brush to remove fused flux along the edges of the weld.

Changes in the spacing of the point of intersection of the rods above the surface of the workpiece has a marked influence on penetration and dilution. A gradual narrowing of the weld and a marked decrease in dilution occurs, for example, as the point of intersection of the rods is raised. This condition finally leads to heavily rounded weld edges and complete lack of fusion to the workpiece. Such condition is not always apparent during the welding operation, since it is possible to maintain satisfactory stability even with excessively high spacing, sufficient to cause the deposited metal to be completely enclosed in a layer of fused flux and not bonded to the base plate. For example, when using conditions of 350 amperes, 25 volts and 10 inches/minute travel speed, the spacing can be changed from ¼ to ⅜ inch, with little change in dilution but a narrowing by ¼ inch of weld width. A further increase in spacing to ½ inch, however, results in only intermittent fusion along the surface of the workpiece and a completely unsatisfactory deposit. Under all such conditions, the welding voltage is quite stable.

It is entirely possible to raise the rods above the surface of the workpiece to such a position that the weld metal does not fuse to the workpiece but is completely enclosed by fused flux. Throughout this change in performance, provided the fused flux is in contact with the workpiece, the voltages between the electrodes and the workpiece remain quite stable, with potentials as low as 20 to 22 volts, and are suitable as governing voltages for controlling the rod feed.

Weld deposits were made with the series-arc technique with the welding current ranging from 1000 to 1200 amperes with a rod intersection point spaced above the base plate of ¾ to ⅞ in., and even under these conditions stable operation was obtained at a control voltage of 22 to 23 volts. It seems highly improbable that this potential is represented by a gap distance as measured from the tips of the rods to the base plate, but rather represents the distance between the end of the rod and the top of the molten deposit. Good electrical contact can exist between the molten puddle and the base metal without fusion.

With the use of the technique of the invention for producing wide multiple-bead deposits, the transverse offset for each successive bead is slightly greater than for the prior single-electrode work-in-circuit technique. Smooth weld surfaces and satisfactory overlapping without slag entrapment were produced when the rods were positioned with approximately ⅟₁₆ inch between the edge of the previously deposited weld to the edge of the nearer rod.

In direct contrast to what might at first be expected, it has been definitely demonstrated that for the technique of the invention a relatively low control voltage between each rod and the workpiece is desirable to obtain shallow fusion of a pentration into the workpiece. This is further evidence that the measured voltage is that between the rod and the molten puddle above the surface of the workpiece. There is a measurable increase in weld metal dilution and a marked increase in the rate of flux consumption as such voltage is raised and more power is expended in the welding zone. There is, however, little change in weld width or reinforcement with a 10-volt change in such potential.

When the control voltage is used for governing the rod-feed mechanism, it is essential that such voltage be reasonably stable. Welds were made with mild steel welding rods at a control potential of 18 volts, although there was some tendency toward short-circuiting under these conditions. When the control voltages exceeded approximately 30 volts, the operation was extremely erratic, and, in some cases, impossible. The most acceptable control voltage range was from 20 to 30 volts, and the best results were obtained at 22 to 23 volts potential between each rod and the workpiece.

It is necessary to employ the optimum rod position in order to maintain relatively stable operation and produce consistent results. By altering the total angle A between rods R, R from 30 to 60 degrees in a transverse vertical plane, little difference in dilution is obtained when welding mild steel at 25 volts; although greater penetration occurs as the angle between rods is increased when welding at 20 volts. There is only a slight difference in weld width under these various conditions, and the widest weld can be produced at 25 volts with an included angle between the rods of 45 degrees. Likewise, the narrowest weld can be made at the largest angle and at 25 volts.

A study was made on the effect of inclining the plane of the welding rods either forward or backward in relation to the direction of travel. For this study, the transverse angle was maintained at 45 degrees, since it was shown to be the most desirable in previous tests. In all the trials, voltage stability was extremely poor when the plane was inclined backward over the deposit and the resultant weld surface was rough, peaked, and irregular in width. In contrast to this, voltage was quite stable with the plane inclined forwardly over the unwelded part, and the welds produced were smooth and uniform. Of particular consequence was a large increase in the rate of fusing flux for both rod positions as compared with the vertical position. This same trend was apparent at different rod spacings with alternating and direct current power. The recommended position of the rods is at an angle A of 45 degrees between rods in the plane which is perpendicular to both the surface of the workpiece and the direction of travel.

Single-bead deposits with two rods of mild steel were made at travel speeds ranging from 5 to 20 inches/minute with a welding current of 350 amperes and a 25 volt potential between each rod and the workpiece. Obviously, as the speed was increased, the weld nugget was decreased in width, height, and total cross sectional area. Of particular importance is the fact that weld dilution was a minimum at 10 inches/minute, and this trend was repeated at two voltage levels. This effect may possibly be explained by the relative position of the molten puddle and the welding rods. At slow speeds of travel the molten pool flows under or in advance of the rods and serves as a cushion for the direct heating effect of the arcs. Dilution is still relatively high at slower speeds because of the longer duration of heat application in the massive weld puddle, and part of this heat is dissipated by the melting of the workpiece. As the travel speed increases, the linear rate of heat input is reduced, and the weld puddle becomes smaller. Such a condition reduces the base metal melting effect, because the quenching rate is high. Further increases in travel speed tend to bring the rods in front of the puddle and cause slightly deeper penetration into the workpiece.

Tests were run to determine the effect of welding rod diameter on the stability and operating characteristics under chosen welding conditions. For any given rod size the best condition is one of low current-density, and, therefore, as rod diameter was changed, it was necessary to alter welding current to minimize dilution. Test results indicate that the degree of fanning-out or spreading of the arc zone is a function of the current-density employed. As the welding current is increased for a given rod size, the relative stiffness of the arc also increased, which resulted in a more deeply penetrated weld. Therefore, as mentioned previously, lower current-densities than those normally employed for single-electrode welding are recommended to produce shallow penetration and wide deposits.

Several combinations of welding control equipment have been tested with the series-arc technique of the invention. The illustrated system, with separate welding voltage controls, operated with complete satisfaction, but any of the standard type welding heads and controls can be combined for series-arc welding according to the invention.

Since the series-arc technique showed outstanding promise for stainless steel cladding operations because of the low dilution obtained, several weld beads and pads were produced with high-alloy rods to determine the composition and corrosion resistance of the deposited weld metals. A 25% chromium, 20% nickel composition was employed to make single-layer pads on mild steel base plate. An unusually small amount of distortion in the base plate was caused by this cladding operation. Penetration was quite uniform and fused flux removal was completely clean. The total loss in chromium caused by dilution and oxidation to the fused flux was slightly less than 13%, leaving about 22% chromium in the deposit.

For hard-surfacing applications it is desirable to produce satisfactory deposits with the standard hard surfacing rods. It is often particularly important to retain carbon in the weld metal and accurately control the chromium content to produce a weld deposit of a composition closely approaching that of the welding rod. A 13% chromium rod was employed, according to the invention, for welding on a plain-carbon steel workpiece. For such test no preheat was used, and the resulting weld pad was completely sound and free from cracks. The carbon content of the first and second layers was actually higher than that of the rod, and the chromium level of the two layers was quite similar and in the range of 11.5–12.0%. The fused flux was self-detaching and no fine slivers of fused flux were left along the edges of this deposit.

It is particularly noteworthy that with the use of series-arc welding, much higher carbon and chromium contents were produced with a consequent higher hardness in the first weld layer than was obtained in a multiple-layer deposit produced by prior work-in-circuit methods.

A strongly convincing demonstration was made of the low dilution and penetration obtained with the technique of this invention. Stainless rod was deposited on 11-gauge (0.125 inch) sheet steel, and the maximum penetration obtained in several sections was approximately 0.04 inch below the top plate surface level. The same welding conditions were employed for producing a deposit on a $\frac{7}{16}$-inch thick base plate for comparison, and the dilution values were equal. In both trials copper backing was used to support the base plate.

A most outstanding achievement has been noted in the drastic reduction in dilution of the weld deposit obtained with the new technique. It has been repeatedly demonstrated that dilution values not exceeding 10% can be obtained by this method. This result permits the use of lower-alloy rods for the production of a deposit of a desired composition. Since dilution has been greatly reduced, the alloy contents of the rod and completed weld are quite similar. A second important improvement has been gained in the deposition rate of the weld metal; more than a twofold increase has been measured. Also, consumption of fused flux has been reduced. Both of these factors increase the efficiency of power used.

Compared with prior single-electrode work-in-circuit methods, the time required to clad or surface a steel plate has been reduced 25 to 50 percent. Total power consumption for cladding a unit area with the series-arc technique is considerably lower than for either single- or multiple-electrode methods of the prior art.

Under normal prior single-electrode work-in-circuit operating techniques, this deposition rate was approximately 0.5 pound, as compared with a rate of 1.1 pounds per 1000 amperes per minute obtained by series-arc welding of the invention. This characteristic is particularly beneficial for applications requiring rapid deposition of metal, such as the production of integral bosses and reinforcing weld pads where dilution is not the primary requirement.

In the foregoing description some of the details of welding described specifically apply to tests made with mild steel welding rod. The application of these principles requires some changes for other metals. For example, it has been possible to produce welds with an aluminum bronze welding rod with the rod intersection below the level of the plate surface. The resultant welds showed very shallow penetration. The invention is not restricted to cladding and surfacing operations, since we have found that this technique can be used for welding and joining of steel plates. This later technique appears to be basically similar to the cladding method. Experimental work has been done with "non-consumable" and non-metallic electrodes. Since it is possible that this method may have some application, the invention includes the use of both consumable and non-consumable rods, either metallic or non-metallic. The original tests made to explore the series-arc technique were accomplished with flux-coated shielded arc welding rods, connected in series with a welding transformer. Some tests were made with argon shielding substituted for the granular flux and some tests had been made with bare rod. In such tests, the welding operation was maintained, although voltage stability was sometimes quite erratic.

The invention is not limited to two electrodes, but includes any number of electrodes connected in series in the welding circuit from which the workpiece per se is excluded except at the welding zone, or via one or more control circuits. Experimental field tests have already been made with three electrodes connected in a modified series circuit (two electrodes connected to one lead and one electrode connected to the other lead of the welding current supply) and the performance was satisfactory. It is entirely possible that a large number of electrodes can be connected in such a manner and that the limiting factor would only be a mechanical one.

We claim:

1. Process of submerged-melt electric series-arc welding a layer of metal on a body of metal, which comprises feeding at least two fusible metallic electrodes at an acute angle toward each other so that their extended longitudinal axes intersect at a point located adjacent the surface of such body, covering the ends of such electrodes and the adjacent surface with flux, supplying welding current through said electrodes so that such current flows directly between the ends of the electrodes in such flux, thereby fusing the metal at the ends of the electrodes, the adjacent flux and the underlying surface metal of the body; moving said electrodes along a desired path over the surface of said body, and automatically regulating the feeding rate of each of said electrodes separately in accordance with the voltage drop between each electrode and the body, so as to maintain such voltage drops between each electrode and the body at substantially constant preselected equal values, whereby the ends of both of said electrodes are progressively melted at a substantially uniform rate, depositing and welding on the surface of said body a relatively wide common layer of such electrode metal, with relatively little dilution thereof by the metal of said body.

2. A submerged-melt electric series-arc welding process which comprises connecting welding rods of metal which are meltable in series electrically with each other and with an appropriate power source, using suitable separate rod-feeding mechanisms to maintain the welding voltages as measured between each rod and a workpiece substantially equal and constant, and without electrically connecting the workpiece into the welding current circuit, applying flux over the ends of the rods to submerge the welding zone, and relatively moving either the workpiece, or the welding rods, with respect to the other in such manner as to deposit and weld a single continuous weld bead or pad of rod metal on the workpiece.

3. Process of submerged-melt electric series-arc welding, which comprises positioning the area of the surface of a workpiece composed of metal in a substantially horizontal plane, positioning at least two fusible metal welding rods in a total included angle of between 30° and 60°, relatively moving the workpiece and the rods in a direction which is substantially parallel to such surface, keeping the convergent ends of the rods and the adjacent surface portion of the workpiece covered with flux, connecting the rods but not the workpiece in series with a welding current source, and automatically feeding each rod by individual means at rates which maintain the voltage drops between the weld deposit on the workpiece and each rod substantially constant and equal, thereby progressively depositing and welding a single layer of metal fused from the rods on the workpiece.

4. Process of submerged-melt electric series-arc welding which comprises depositing a single bead of metal on a metallic workpiece under flux, by relatively moving electrodes and the workpiece along the path to be welded, separately feeding such electrodes toward a common welding zone on the workpiece at rates which are individually governed by the voltage drop between each of such electrodes and the workpiece, supplying arc welding current only through such electrodes, the workpiece being excluded from the arc welding current circuit except in the immediate area of the welding zone, whereby a single layer of metal is welded on the workpiece with a minimum amount of penetration and dilution.

5. Process of cladding work composed of low-alloy steel with a layer of high-alloy metal by submerged-melt electric series-arc welding, which comprises positioning a pair of fusible metal welding rods of high-alloy above an upper surface of the low-alloy steel work at an acute included angle of 30–60 degrees with respect thereto and to each other, and with the longitudinal axes of such rods lying in a plane which is substantially perpendicular to such surface, the ends of such rods being adapted to meet above such upper surface of the work, covering the rod end portions with a common blanket of granular submerged-melt welding flux disposed on such surface, striking an arc between such rod ends under such blanket of flux and supplying welding current at a value of the order of 300–400 amperes through said rods in series with such arc, fusing the rod metal and the flux and the surface metal underlying such arc over a relatively wide area by virtue of the effect of repulsion between the rods due to the magnetic field surrounding the welding current of the series arc submerged under the flux blanket, moving such rods and the work relatively along a path extending at substantially right angles to the plane containing the axes of such rods at a speed of the order of 10 inches per minute, separately feeding each of such rods axially toward the arc at a rate which automatically maintains the voltages between each rod and the work substantially equal and at a substantially contant value of between 20 and 30 volts, and rapidly depositing and welding a relatively wide continuous layer of metal on the surface of the work with consistently small penetration having a dilution value of not more than 10 percent, at a deposition rate of the order of one pound of deposited metal per 1000 amperes of welding current per minute.

6. Submerged-melt series-arc welding apparatus comprising, in combination, a pair of separate submerged-melt welding heads comprising means for simultaneously feeding fusible metal electrodes downwardly at an acute included angle toward a common point located adjacent the upper surface of fusible metal work disposed under such electrodes, a separate electrode feed motor associated with each of said heads, means for feeding granular fusible flux onto such upper surface of the work to cover the convergent end portions of the electrodes with a common layer of such flux, means for supplying welding current to said heads and electrodes in series, forming a series arc within such flux layer between the convergent ends of such electrodes which arc melts the metal thereof, fuses the adjacent flux and the underlying metal on the surface of the work, and sets up a separate voltage between each electrode and such work, and separate means responsive to such voltage between each electrode and the work, for automatically controlling the speed of the respective electrode feed motor so as to separately feed said electrodes downwardly toward each other and the work at a rate which keeps such voltages substantially equal and constant, thereby balancing the series arc submerged under such flux.

FREDERICK G. OUTCALT.
EDWARD L. FROST.

References Cited in the file of this patent

UNITED STATES PATENTS

| Number | Name | Date |
|---|---|---|
| 1,707,433 | Hand | Apr. 2, 1929 |
| 1,942,055 | Gilbert | Jan. 2, 1934 |
| 2,401,722 | Clapp et al. | June 11, 1946 |
| 2,402,165 | Kinkead | June 18, 1946 |
| 2,423,515 | Morris | July 8, 1947 |
| 2,494,718 | Palmer | Jan. 17, 1950 |